US008945291B2

United States Patent
Prabhu

(10) Patent No.: US 8,945,291 B2
(45) Date of Patent: Feb. 3, 2015

(54) DEMISTER VANE IN SITU CLEANING FIXTURE

(75) Inventor: Padmanabha J. Prabhu, Monroeville, PA (US)

(73) Assignee: Westinghouse Electric Company LLC, Cranberry Township, PA (US)

(*) Notice: Subject to any disclaimer, the term of this patent is extended or adjusted under 35 U.S.C. 154(b) by 529 days.

(21) Appl. No.: 13/343,736

(22) Filed: Jan. 5, 2012

(65) Prior Publication Data

US 2012/0167533 A1   Jul. 5, 2012

Related U.S. Application Data

(60) Provisional application No. 61/429,785, filed on Jan. 5, 2011.

(51) Int. Cl.
*B01D 41/00* (2006.01)
*B01D 45/10* (2006.01)

(52) U.S. Cl.
CPC ...................................... *B01D 45/10* (2013.01)
USPC ................... 96/232; 96/356; 96/358; 55/342; 55/343; 55/440; 55/441; 55/442; 55/443; 55/444; 55/445; 55/464; 55/465; 55/434; 55/345; 55/346; 55/347; 55/447; 55/484

(58) Field of Classification Search
CPC ...... B01D 45/08; B01D 45/16; A47L 9/1625; A47L 9/1641; A47L 9/1666
USPC ........... 55/342–343, 440–445, 464–465, 434, 55/345–347, 447, 484; 96/356, 358
See application file for complete search history.

(56) References Cited

U.S. PATENT DOCUMENTS

| | | | |
|---|---|---|---|
| 1,899,017 | A | 2/1933 | Dauphinee |
| 2,878,892 | A | 3/1959 | Field |
| 4,056,477 | A | 11/1977 | Ravitts |

(Continued)

FOREIGN PATENT DOCUMENTS

| | | |
|---|---|---|
| GB | 360366 | 11/1931 |
| GB | 450439 | 7/1936 |
| WO | WO 86/03424 A1 | 6/1986 |

OTHER PUBLICATIONS

International Search Report for PCT/US2012/020274 dated Apr. 24, 2012 (Form PCT/ISA/210).

(Continued)

*Primary Examiner* — Dung H Bui
(74) *Attorney, Agent, or Firm* — Joseph C. Spadacene; Richard J. Coldren; Westinghouse Electric Company LLC

(57) ABSTRACT

This invention relates to an in-situ cleaning fixture for mist removal separator vane assemblies. The cleaning fixture includes an injection chamber with an inlet and a perforated plate which extends horizontally, substantially over the length of the mist removal separator vane assembly. A cleaning fluid source is connected to the injection chamber during a cleaning process. The injection chamber is designed to receive the cleaning fluid, pass the cleaning fluid through the holes formed in the plate, downwardly along a plurality of vanes in the mist removal separator vane assembly and into the drain trough. The in-situ cleaning fixture facilitates removal of scale build-up from the mist removal separator vane assembly and thereby restores the efficacy of the vanes.

10 Claims, 5 Drawing Sheets

(56) References Cited

U.S. PATENT DOCUMENTS

| | | | |
|---|---|---|---|
| 4,157,250 A | * | 6/1979 | Regehr et al. .................... 96/299 |
| 4,251,242 A | * | 2/1981 | Ito .................................. 96/232 |
| 4,366,132 A | | 12/1982 | Holter et al. |
| 4,714,054 A | | 12/1987 | Minard et al. |
| 5,908,376 A | | 6/1999 | Macaluso et al. |

OTHER PUBLICATIONS

Written Opinion of the International Searching Authority for PCT/US2012/020274 dated Apr. 24, 2012 (Form PCT/ISA/237).
International Preliminary Report on Patentability for PCT/US2012/020274 dated Jul. 10, 2013 (Forms PCT/IB/373, PCT/ISA/237).
Supplementary European Search Report for EP12731960 dated May 15, 2014.

* cited by examiner

DEMISTER VANE IN SITU CLEANING FIXTURE

CROSS-REFERENCE TO RELATED APPLICATIONS

This patent application claims priority to United States Provisional Patent Application No. 61/429,785 which was filed on Jan. 5, 2011.

BACKGROUND

1. Field

This invention relates generally to mist removal separator vanes and more particularly to a fixture for in-situ cleaning of mist removal separator vanes to remove scale build-up.

2. Description of Related Art

In general, mist removal separator vanes are installed in components wherein moisture is removed from saturated steam. The mist removal separator vanes are capable to remove liquid droplets among the steam vapor. For example, the mist removal separator vanes aggregate the mist in the pockets of the vanes and let them flow down the pockets to separate the liquid from the steam vapor. It is known to use mist removal separator vanes in a variety of components and applications. Mist removal separator vane assemblies are used in the nuclear industry as well as in non-nuclear applications. In non-nuclear facilities, mist removal separator vane assemblies are installed in moisture separators and similar components. In nuclear plants, mist removal separator vane assemblies are also installed in steam generators.

In general, the installation and operation of mist removal separator vane assemblies in steam generators results in scale build-up on the vane assemblies. The rate of scale build-up depends on the rate of ingress of particulate material such as magnetite into the steam generators.

A nuclear reactor, such as a pressurized water reactor or a heavy water reactor, contains steam generators in which a separate stream of water circulates in a heat transfer relationship with the primary fluid. The steam generator typically consists of a vertically-oriented shell and a plurality of U-shaped tubes disposed in the shell so as to form a tube bundle. The primary fluid is heated by circulation through the reactor and enters the steam generator through a primary fluid inlet, flows through the U-tube bundle and out a primary fluid outlet to the remainder of the reactor coolant system. At the same time, feedwater is introduced into the steam generator secondary side, i.e., the side of the steam generator interfacing with the outside of the tube bundle. Heat is transferred from the primary fluid in the tubes to water surrounding the tubes causing a portion of the water surrounding the tubes to be converted to steam. The mixture of steam and water then rises and is conducted through a number of moisture separators that separate entrained water from the steam, and the steam vapor then exits the steam generator and is typically circulated through a turbine to generate electricity in a manner well known in the art. Mist removal separator vane assemblies can be located in the steam generators (e.g., secondary side) and/or the moisture separators.

The ingress of particulate material such as magnetite contained in the feedwater which circulates through the steam generator can cause scale build-up in the mist removal separator vane assemblies located in the steam generator. As a result, the effectiveness of the mist removal separator vanes decreases over time and the amount of moisture carryover in the steam increases. Increase in moisture carryover is undesirable for efficient plant operation. Thus, it is beneficial to clean the vane assemblies to remove the scale build-up and restore their effectiveness.

The mist removal separator vane assemblies can include a wide variety of designs and configurations. Generally, the mist removal separator vanes which are installed inside steam generators of nuclear reactors have a zigzag geometry and several embedded pockets. This particular design, while effective for removing moisture from the steam flow, is difficult to clean without dismantling the vane assembly. Further, in certain steam generator designs, there is a perforated plate welded to the inlet face of the vane assembly which further obstructs access to the vanes for cleaning. Removal of the vanes from the steam generator can require significant time and labor which can thereby result in additional costs.

It is an object of the embodiments described herein to provide a cleaning fixture for in-situ cleaning of the mist removal separator vane assemblies positioned in various components, e.g., nuclear and non-nuclear applications, such that the dismantling of the mist removal separator vane assemblies is not necessary to effectively clean the vanes.

SUMMARY

These and other objects are achieved by the embodiments described herein which provide an in-situ, cleaning fixture for a mist removal separator vane assembly. The assembly has a vane bank and a drain trough both of which extend substantially over a horizontal length of the assembly. The vane bank has a plurality of vanes which extend downwardly toward the drain trough. The cleaning fixture includes an injection chamber positioned above the vane bank. The injection chamber includes an inlet and a plate. The plate extends substantially over a horizontal length of the vane bank. The plate has a plurality of holes formed therein. The cleaning fixture also includes a means for connecting a cleaning fluid source to the inlet of the injection chamber. The injection chamber is designed to receive cleaning fluid from the cleaning fluid source. The cleaning fluid is passed through the holes in the plate, downward along the plurality of vanes and into the drain trough.

Further, another embodiment provides a method of in-situ cleaning of a mist removal separator vane assembly having a vane bank and a drain trough both of which extend substantially over a horizontal length of the assembly. The vane bank has a plurality of vanes which extend downwardly toward the drain trough. The method includes connecting to the mist removal separator vane assembly a cleaning fixture which includes an injection chamber and a means for connecting a cleaning fluid source. The injection chamber is positioned above the vane bank. The injection chamber has an inlet and a plate. The plate extends substantially over a horizontal length of the vane bank. The plate has a plurality of holes formed therein. The cleaning fluid source is connected by said means to the inlet of the injection chamber. The injection chamber is designed for receiving cleaning fluid from the cleaning fluid source, passing the fluid through the holes in the plate, downwardly along the plurality of vanes and into the drain trough.

Moreover, yet another embodiment provides a steam generator including an in-situ, cleaning fixture for a mist removal separator vane assembly. The assembly has a vane bank and a drain trough both of which extend substantially over a horizontal length of the assembly. The vane bank has a plurality of vanes which extend downwardly toward the drain trough. The cleaning fixture includes an injection chamber positioned above the vane bank. The injection chamber includes an inlet and a plate. The plate extends substantially over a horizontal length of the vane bank. The plate has a plurality of holes formed therein. The cleaning fixture also includes a means for connecting a cleaning fluid source to the inlet of the injection chamber. The injection chamber is designed to receive cleaning fluid from the cleaning fluid source. The cleaning fluid is passed through the holes in the plate, downward along the plurality of vanes and into the drain trough.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENTS

Figure 1:
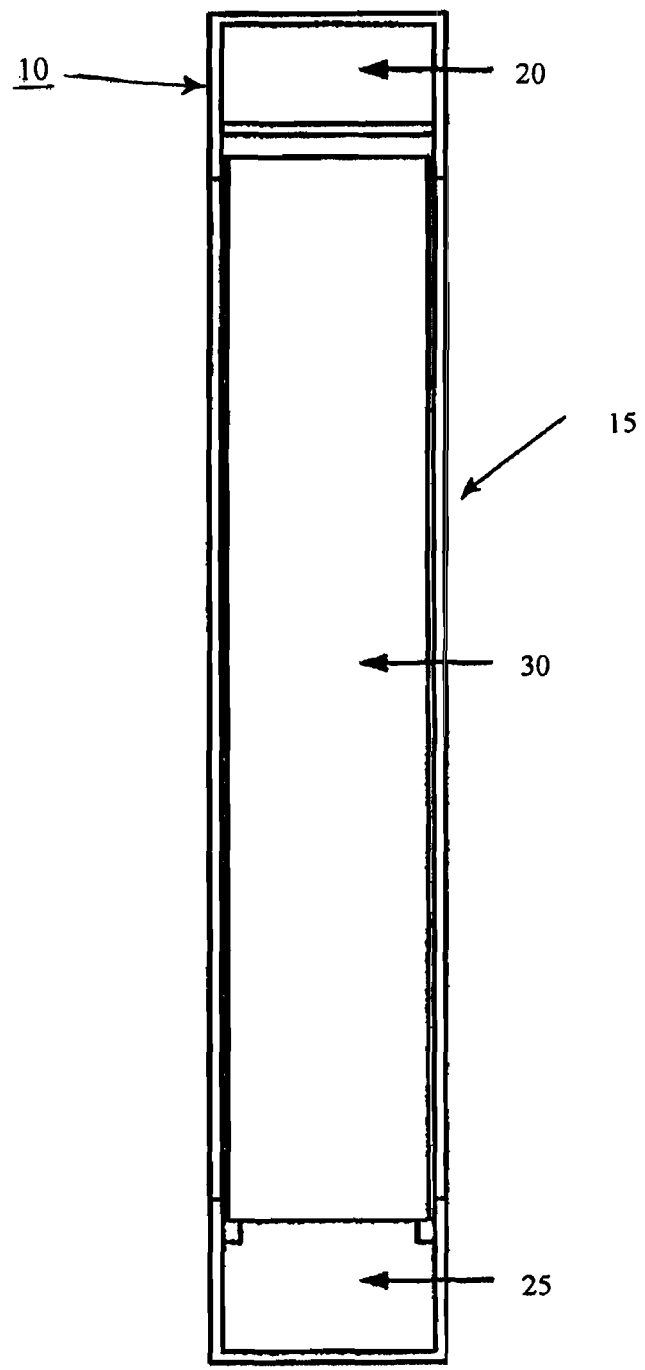
FIG. 1 is a side view of a mist removal vane assembly cleaning fixture, in accordance with certain embodiments of the invention.

In one embodiment, a cleaning fixture is incorporated into a mist removal separator vane assembly. The cleaning fixture allows the mist removal separator vane assembly to be cleaned in-situ. Since it is not necessary to remove or dismantle the mist removal separator vane assembly from the component in which it is contained, in-situ cleaning can provide time, labor and cost savings as compared to other means of cleaning the mist removal separator vanes. Various mist removal separator vane assemblies are known in the art. Typically, the mist removal separator vane assembly includes a vane bank and a drain trough, wherein the drain trough is located below the vane bank which includes a plurality of vanes that are spaced in close proximity to one another and extend downwardly toward the drain trough.

The cleaning fixture includes an injection chamber located above the bank of vanes within the mist removal separator vane assembly. The mist removal separator vanes are positioned in the vane assembly between the injection chamber (at the top) and the drain trough (at the bottom). The injection chamber includes an inlet that is connected to a source which supplies a cleaning fluid when the cleaning process is applied. Further, the injection chamber includes a plate having one or more holes formed therein such that the cleaning fluid flows into the injection chamber from the source, and then through the holes, downwardly along the vertical length of the mist removal separator vane assembly and into the drain trough. The injection chamber, plate and drain trough extend horizontally substantially over the horizontal length of the mist removal separator vane assembly.

The flow path of the cleaning fluid allows it to access and penetrate various difficult-to-reach vane geometries and configurations. Vane designs known in the art can include angles, corners, crevices, pockets and the like which are difficult to access for cleaning and therefore, may contain scale build-up. For example, the vanes in a mist removal separator vane assembly may have a zigzag geometry and contain several embedded pockets. Penetration and cleaning of the pockets may not be achieved with a cleaning fluid that is injected onto the side of the vane bank, as may be carried out by other cleaning techniques.

The cleaning fluid can include a wide variety of liquids known in the art for cleaning. Selection of the cleaning fluid can depend on various factors, such as but not limited to, the material of construction of the mist removal separator vane assembly, the component in which it is located, its particular application and the composition of the scale build-up. In alternate embodiments, the cleaning fluid can include water, known cleansers, known chemical cleaning formulations and mixtures thereof. Following its use in cleaning the mist removal separator vane assembly, the cleaning fluid waste is collected downstream of the drain trough along with scale that is removed from the vanes.

Furthermore, the material of construction of the cleaning fixture can vary and can include those materials known in the art for such applications. The material of construction may depend on various factors, such as but not limited to, the material of construction of the mist removal separator vane assembly, the component in which it is located, the system in which it is located and its particular application.

The cleaning fixture will also include various piping and connections that allow the injection chamber to be integrated with a cleaning fluid source during application of the cleaning process.

Referring now to the drawings, FIG. 1 shows a cross-section of a cleaning fixture 10 in accordance with certain embodiments of the invention. The cleaning fixture 10 includes a cleanser injection chamber 20 positioned above a mist removal vane bank 30. The mist removal vane bank 30 includes a plurality of mist removal vanes (not shown in this figure) and is positioned within a mist removal vane assembly 15. The mist removal vane bank 30 is positioned between the cleanser injection chamber 20 and a drain trough 25. The cleanser injection chamber 20 includes openings (not shown in this figure) to allow cleaning fluid to enter the mist removal vane bank 30. The cleaning fluid flows through the cleanser injection chamber 20, downward along the vertical length of the mist removal vane bank 30 and into the drain trough 25. The cleaning fluid penetrates into the pockets of the mist removal vanes (not shown in this figure) of the mist removal vane bank 30 to remove scale deposited thereon. The cleaning fluid and scale contained therein flow into and through the drain trough 25. From the drain trough 25, the cleaning fluid and scale can flow to a lower portion of a steam generator (not shown) from where they may be removed.

Figure 2:
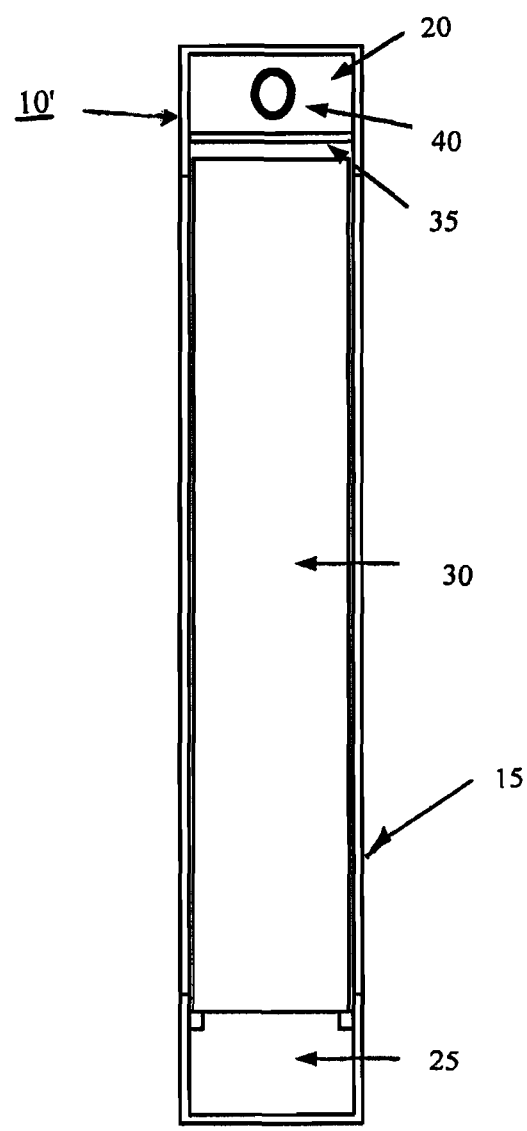
FIG. 2 is a side view of a mist removal vane assembly cleaning fixture, in accordance with certain embodiments of the invention.

FIG. 2 shows a cross-section of a mist removal vane assembly cleaning fixture 10' in accordance with certain embodiments of the invention. FIG. 2 includes the mist removal vane assembly 15, the cleanser injection chamber 20, the drain trough 25 and the mist removal vane bank 30, as shown in FIG. 1. In addition, FIG. 2 shows a perforated plate 35 which forms the bottom surface of the cleanser injection chamber 20 and a hose connection 40 located above the perforated plate 35. The hose connection 40 allows a cleaning fluid source (not shown) to be connected thereto and for the cleaning fluid to enter the cleanser injection chamber 20. The cleaning fluid then flows through the perforated plate 35, downward along the mist removal vane bank 30 and into the drain trough 25.

Figure 3:
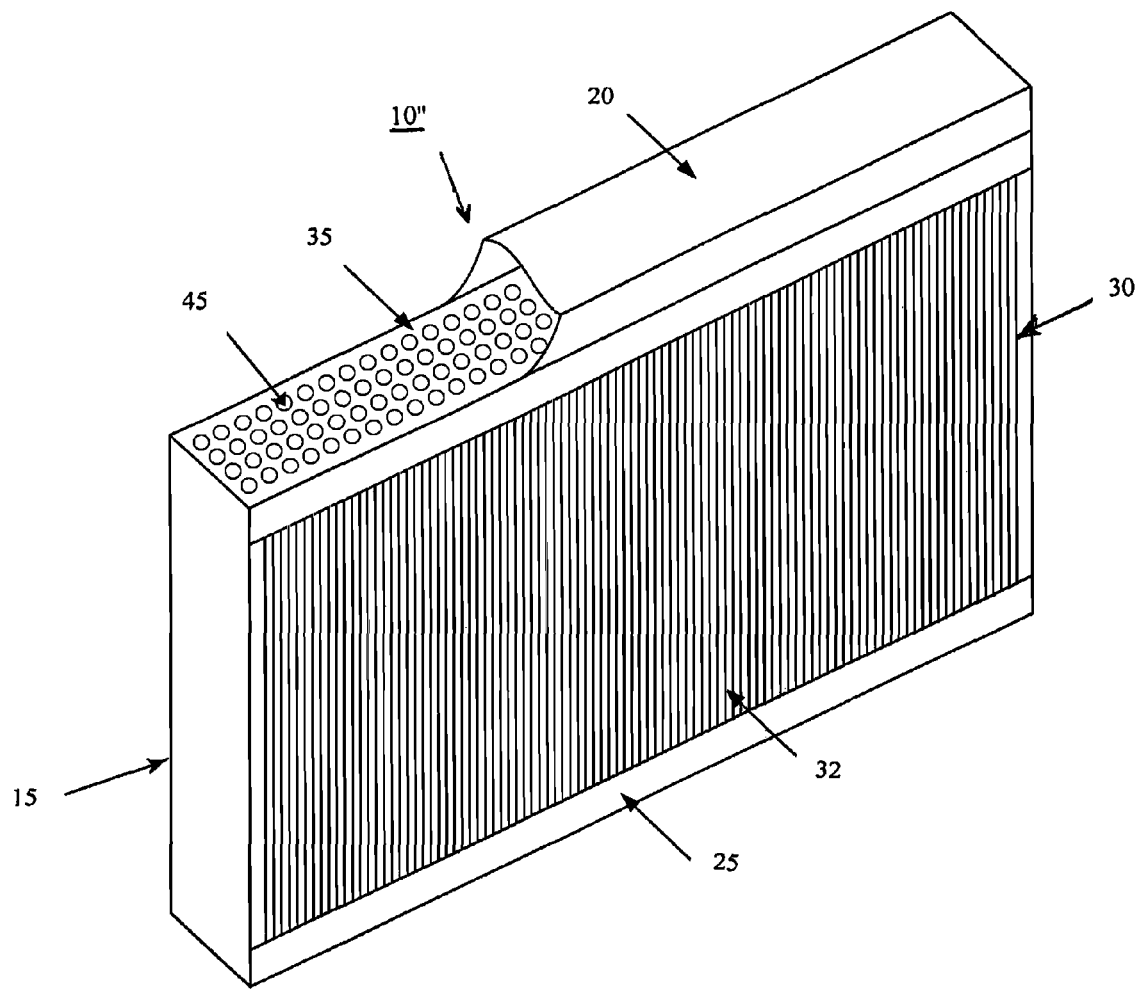
FIG. 3 is a perspective view, partially cut-away, of a mist removal vane assembly cleaning fixture, in accordance with certain embodiments of the invention.

FIG. 3 shows a perspective front view of a cleaning fixture 10" in accordance with certain embodiments of the invention.

FIG. 3 includes the mist removal vane assembly 15, the cleanser injection chamber 20, the drain trough 25 and the mist removal vane bank 30, as shown in FIG. 1. Further, FIG. 3 includes the perforated plate 35 which is shown in FIG. 2. In addition, FIG. 3 shows a plurality of mist removal vanes 32 within the mist removal vane bank 30 and a plurality of openings 45 which are formed in the perforated plate 35. A person of ordinary skill will recognize that the number of mist removal vanes 32 and, the number and arrangement of openings 45 can vary widely and are not limited to the number and arrangement shown in FIG. 3. In the process of cleaning the plurality of mist removal vanes 32, cleaning fluid enters the cleanser injection chamber 20, flows through the plurality of openings 45 in the perforated plate 35, downwardly along the plurality of mist removal vanes 32 and into the drain trough 25.

Figure 4:
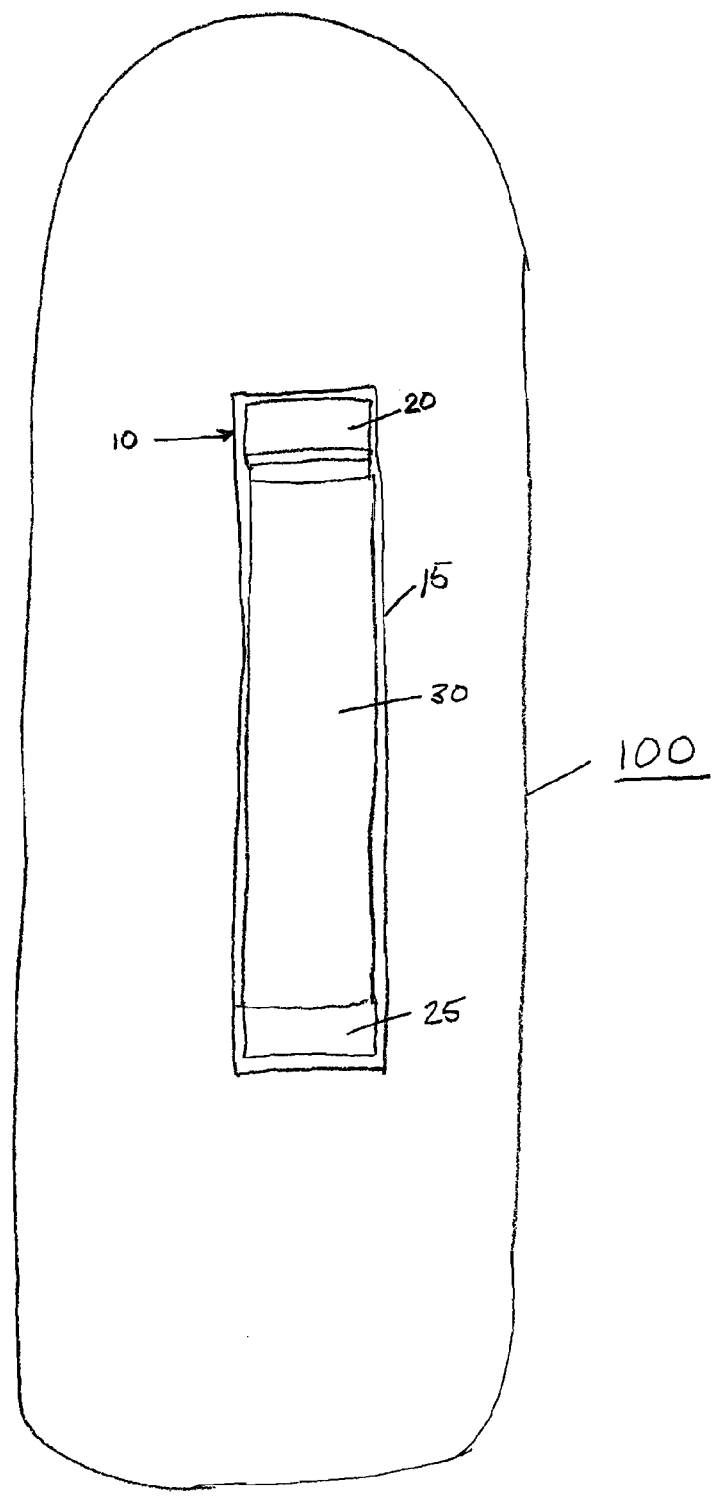
FIG. 4 is a schematic of a steam generator including the mist removal vane assembly cleaning fixture shown in FIG. 1, in accordance with certain embodiments of the invention.

FIG. 4 shows a schematic of a steam generator 100 and the cleaning fixture 10 (see FIG. 1) positioned within the steam generator 100. FIG. 4 includes the mist removal vane assembly 15, the cleanser injection chamber 20, the drain trough 25 and the mist removal vane bank 30, as shown in FIG. 1. The cleaning fixture 10 and the mist removal vane assembly 15 are coupled to the steam generator using various connections known in the art (not shown).

Figure 5:
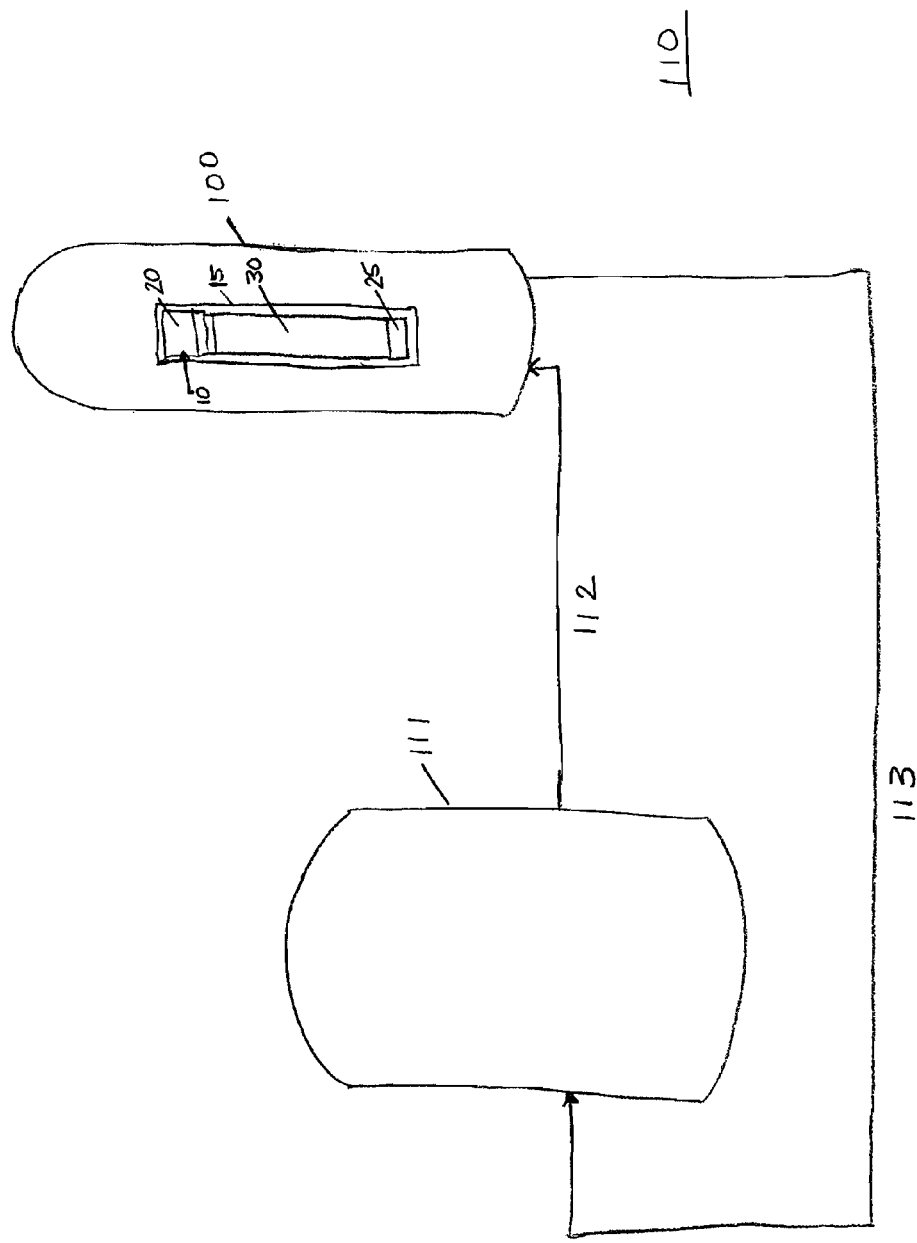
FIG. 5 is a schematic of a nuclear steam supply system including the steam generator and mist removal vane assembly cleaning fixture as shown in FIG. 4, in accordance with certain embodiments of the invention.

FIG. 5 shows a schematic of a nuclear steam supply system 110, the steam generator 100 (see FIG. 4) and the cleaning fixture 10 (see FIG. 1) positioned within the nuclear steam supply system 110. FIG. 5 includes the steam generator 100, as shown in FIG. 4. Further, FIG. 5 includes the mist removal vane assembly 15, the cleanser injection chamber 20, the drain trough 25 and the mist removal vane bank 30, as shown in FIG. 1. In addition, FIG. 5 shows a reactor 111 and flow lines 112 and 113. Primary coolant water circulates through the flow lines 112 and 113.

Further, another embodiment provides a method of in-situ cleaning of a mist removal separator vane assembly. The method includes connecting, such as by attaching or coupling, the cleaning fixture described herein (including the embodiments shown in FIGS. 1 through 3) to a mist removal separator vane assembly. For example, the mist removal separator vane assembly can include a vane bank and a drain trough both of which extend substantially over a horizontal length of the assembly. The vane bank has a plurality of vanes which extend downwardly toward the drain trough. The method includes connecting to the mist removal separator vane assembly a cleaning fixture which includes an injection chamber and a means for connecting a cleaning fluid source. The injection chamber is positioned above the vane bank. The injection chamber has an inlet and a plate extending substantially over the horizontal length of the vane bank. The plate has a plurality of holes formed therein. The cleaning fluid source is connected by said means to the inlet of the injection chamber. The injection chamber is designed for receiving cleaning fluid from the cleaning fluid source, passing the fluid through the holes in the plate, downwardly along the plurality of vanes and into the drain trough.

The cleaning fixture and method of in-situ cleaning described herein can be applied to a variety of mist removal separator vane assemblies which are contained in a variety of components and systems. In certain embodiments, the cleaning fixture and method of in-situ cleaning are employed in steam generators and moisture separators. Further, in certain embodiments, the cleaning fixture and in-situ cleaning method are employed in steam generators and moisture separators which are components in reactor systems, such as pressurized water reactors and heavy water reactors.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof. As a non-limiting example, the size, shape and number of the openings 40 can be varied at the discretion of the designer to accomplish the same objective. Another non-limiting example is the perforated plate at the bottom of the injection chamber, which may be made of a shape different from a flat plate.

What is claimed is:

1. A mist removal separator vane assembly having an in-situ cleaning fixture, the mist removal separator vane assembly and in-situ cleaning fixture being positioned in a component in a nuclear reactor, the mist removal separator vane assembly being structured to separate moisture from steam generated in the nuclear reactor, comprising:
   a vane bank extending substantially over a horizontal length of the vane assembly and having a plurality of vanes; and
   a drain trough extending substantially over a horizontal length of the vane assembly,
   wherein the plurality of vanes extend downwardly toward the drain trough,
   the in-situ cleaning fixture being structured to at least partially remove scale build-up in the vane bank without removing the vane assembly from the component, comprising:
   an injection chamber positioned above the vane bank, having an inlet and a plate extending substantially over the horizontal length of the vane bank, the plate having a plurality of holes formed therein, the injection chamber structured to receive cleaning fluid, pass the fluid through the holes in the plate, downwardly along the plurality of vanes and into the drain trough;
   a cleaning fluid source being structured to supply the cleaning fluid to the injection chamber during application of a cleaning process; and
   a means for connecting the cleaning fluid source to the inlet of the injection chamber.

2. The mist removal separator vane assembly of claim 1, wherein said component is a steam generator.

3. The mist removal separator vane assembly of claim 1, wherein said nuclear reactor is selected from the group consisting of a pressurized water reactor and a heavy water reactor.

4. The mist removal separator vane assembly of claim 1, wherein said component is a moisture separator.

5. The mist removal separator vane assembly of claim 1, wherein the plate forms a bottom surface of the injection chamber.

6. The mist removal separator vane assembly of claim 1, wherein cleaning fluid waste and the scale build-up removed from the plurality of vanes flow from the drain trough into a lower portion of the component and is discharged therefrom.

7. The mist removal separator vane assembly of claim 1, wherein the plate separates the injection chamber from the vane bank.

8. A method of at least partially removing scale build-up from a mist removal separator vane assembly positioned in a component of a nuclear reactor without removing the assembly from the component, comprising:

providing the mist removal separator vane assembly being structured to separate moisture from steam, comprising:
a vane bank; and
a drain trough,
wherein both of the vane bank and the drain trough extend substantially over a horizontal length of the vane assembly, the vane bank having a plurality of vanes which extend downwardly toward the drain trough,
connecting to the mist removal separator vane assembly an in-situ cleaning fixture being structured to at least partially remove scale build-up in the vane bank, which comprises:
an injection chamber positioned above the vane bank, having an inlet and a plate extending substantially over the horizontal length of the vane bank, the plate having a plurality of holes formed therein, the injection chamber structured to receive cleaning fluid, pass the fluid through the holes in the plate, downwardly along the plurality of vanes and into the drain trough;
a cleaning fluid source being structured to supply the cleaning fluid to the injection chamber during application of a cleaning process; and
a means for connecting the cleaning fluid source to the inlet of the injection chamber;
supplying the cleaning fluid from the cleaning fluid source into the injection chamber during application of a cleaning process;
allowing the cleaning fluid to pass through the holes in the plate and downwardly along the plurality of vanes;
at least partially removing scale build-up from the plurality of vanes;
collecting cleaning fluid waste and the scale build-up removed from the plurality of vanes into the drain trough; and
removing the cleaning fluid waste and the scale from the drain trough.

9. A steam generator positioned in a nuclear steam supply system, comprising:
a mist removal separator vane assembly structured to remove moisture from steam in the steam generator; the vane assembly comprising:
a vane bank; and
a drain trough,
wherein both of the vane bank and the drain trough extend substantially over a horizontal length of the assembly, the vane bank having a plurality of vanes which extend downwardly toward the drain trough; and
an in-situ, cleaning fixture connected to the mist removal separator vane assembly and structured to at least partially remove scale build-up from the vane bank without removal of the vane bank from the steam generator, comprising:
an injection chamber positioned above the vane bank, having an inlet and a plate extending substantially over the horizontal length of the vane bank, the plate having a plurality of holes formed therein, the injection chamber structured to receive cleaning fluid, pass the fluid through the holes in the plate, downwardly along the plurality of vanes and into the drain trough;
a cleaning fluid source being structured to supply the cleaning fluid to the injection chamber during application of a cleaning process; and
a means for connecting the cleaning fluid source to the inlet of the injection chamber.

10. The steam generator of claim 9, wherein the nuclear steam supply system is selected from the group consisting of a pressurized water reactor and a heavy water reactor.

\* \* \* \* \*